US009587869B2

(12) United States Patent
Burnham et al.

(10) Patent No.: US 9,587,869 B2
(45) Date of Patent: Mar. 7, 2017

(54) LOW LOAD CAPACITY PROTECTION (71) Applicant: THERMO KING CORPORATION, Minneapolis, MN (US)

(72) Inventors: Randall Scott Burnham, St. Michael, MN (US); Mike Stark, Redding, CA (US); Mike Gaynor, Apple Valley, MN (US); J J Foo, Singapore (SG)

(73) Assignee: THERMO KING CORPORATION, Minneapolis, MN (US)

( * ) Notice: Subject to any disclaimer, the term of this patent is extended or adjusted under 35 U.S.C. 154(b) by 0 days.

(21) Appl. No.: 14/777,289

(22) PCT Filed: Mar. 14, 2014

(86) PCT No.: PCT/US2014/027182
§ 371 (c)(1),
(2) Date: Sep. 15, 2015

(87) PCT Pub. No.: WO2014/152299
PCT Pub. Date: Sep. 25, 2014

(65) Prior Publication Data
US 2016/0025397 A1    Jan. 28, 2016

Related U.S. Application Data (60) Provisional application No. 61/789,060, filed on Mar. 15, 2013.

(51) Int. Cl.
*F25B 49/00* (2006.01)
*F25B 49/02* (2006.01)
(Continued)

(52) U.S. Cl.
CPC ............ *F25B 49/025* (2013.01); *F25B 31/02* (2013.01); *H02P 9/04* (2013.01); *H02P 9/30* (2013.01)

(58) Field of Classification Search
CPC .... F25B 49/025; F25B 31/02; F25B 2327/00; F25B 2327/002; F25B 2700/171; H02P 9/30; H02P 9/04; H02P 9/00
See application file for complete search history.

(56) References Cited

U.S. PATENT DOCUMENTS 1,387,742 A * 8/1921 Strong ...................... H02P 9/00
290/22
1,584,602 A * 5/1926 Bradshaw ............... H02P 23/16
290/40 B
(Continued)

FOREIGN PATENT DOCUMENTS

CN         86106549         7/1987
CN         101734160        6/2010
(Continued)

OTHER PUBLICATIONS

International Search Report and Written Opinion for International Application No. PCT/US2014/027182, Dated Aug. 13, 2014, 11 pgs.
(Continued)

*Primary Examiner* — M. Alexandra Elve
*Assistant Examiner* — Alexis Cox
(74) *Attorney, Agent, or Firm* — Hamre, Schumann, Mueller & Larson, P.C.

(57) ABSTRACT

A generator set for a transport refrigeration unit that is operable at a first frequency and a second frequency. The generator set includes a controller, a generator and a prime mover coupled to the generator. The prime mover selectively drives the generator in least at a first non-zero speed and a second non-zero speed. The controller can determine whether a transport refrigeration unit has sufficient capacity to maintain a desired temperature within a transport unit by (Continued)

detecting a generator load, a generator load slope condition, and a speed of the prime mover.

17 Claims, 5 Drawing Sheets

(51) Int. Cl.
*H02P 9/04* (2006.01)
*H02P 9/30* (2006.01)
*F25B 31/02* (2006.01)

(56) References Cited

U.S. PATENT DOCUMENTS

| | | | |
|---|---|---|---|
| 4,788,487 A | 11/1988 | Picklesimer | |
| 5,023,527 A * | 6/1991 | Erdman | F23N 3/082 318/400.03 |
| 5,123,253 A | 6/1992 | Hanson et al. | |
| 5,125,236 A | 6/1992 | Clancey et al. | |
| 5,161,384 A | 11/1992 | Hanson et al. | |
| 5,284,026 A | 2/1994 | Powell | |
| 6,044,651 A | 4/2000 | Reason et al. | |
| 6,107,927 A | 8/2000 | Dvorsky et al. | |
| 6,367,273 B2 | 4/2002 | Takagi et al. | |
| 6,688,125 B2 | 2/2004 | Okamoto et al. | |
| 6,708,507 B1 | 3/2004 | Sem et al. | |
| 7,365,443 B2 | 4/2008 | Gendron | |
| 7,878,013 B2 | 2/2011 | Matsuno et al. | |
| 8,185,251 B2 | 5/2012 | Burnham et al. | |
| 8,418,483 B2 | 4/2013 | McSweeney et al. | |
| 8,448,459 B2 | 5/2013 | McSweeney et al. | |
| 2003/0030416 A1* | 2/2003 | Fukaya | H02P 9/30 322/24 |
| 2007/0296379 A1 | 12/2007 | Gendron | |
| 2008/0083238 A1 | 4/2008 | Sandkoetter | |
| 2008/0087029 A1* | 4/2008 | Renken | B60H 1/3222 62/134 |
| 2013/0061621 A1 | 3/2013 | Nielsen | |

FOREIGN PATENT DOCUMENTS

| | | |
|---|---|---|
| DE | 60021299 | 5/2006 |
| DE | 102006048821 | 4/2008 |
| DE | 112014001469 | 12/2015 |

OTHER PUBLICATIONS

Chinese Office Action cited in Chinese Application No. 201480016179.8 dated Sep. 19, 2016 (8 pages); English translation.
Office Action for German Patent Application No. 112014001469.9, dated Aug. 10, 2016 (8 pages).

* cited by examiner

*Fig. 4*

LOW LOAD CAPACITY PROTECTION

FIELD

The embodiments disclosed herein relate to a generator set for a transport refrigeration unit. More specifically, the embodiments described herein relate to a control system for a multi-speed generator set that can detect a capacity of a transport refrigeration unit and change the speed of the generator set to maintain a desired temperature within a transport unit.

BACKGROUND

Existing transport refrigeration systems are used to cool containers, trailers, and other similar transport units. Modern containers may be efficiently stacked for shipment by ship or rail. When containers are shipped by truck, a single container is placed on a trailer chassis. When cargo in the container includes perishable products (e.g., food product, flowers, etc.), the temperature of the container must be controlled to limit loss of the cargo during shipment.

Some existing transport units include a generator set that supplies power to temperature-controlling components of the transport refrigeration system. These generator sets are typically attached directly to the container or trailer, and include an engine or motor to power a generator. During shipment of the transport units, the transport refrigeration systems must operate for extended periods of time (e.g., days, weeks).

SUMMARY

The embodiments disclosed herein relate to a generator set for a transport refrigeration unit. More specifically, the embodiments described herein relate to a control system for a multi-speed generator set that can detect a capacity of a transport refrigeration unit and change the speed of the generator set to maintain a desired temperature within a transport unit.

The embodiments described herein allow the generator set to detect when the transport refrigeration unit does not have sufficient capacity to maintain a desired temperature within a transport unit, and change the speed of the generator set to allow the transport refrigeration unit to provide sufficient capacity to maintain a desired temperature within the transport unit.

Also, the embodiments described herein can prevent thermal damage to a generator of the generator set that can occur when the generator is run at an increased load case for an extended period of time.

In some embodiments, the generator set includes a controller that can change the speed of the generator set from a first speed to a second speed or vice versa in order to allow the transport refrigeration unit to provide sufficient capacity to maintain a desired temperature within the transport unit.

In some embodiments, the generator set can change speeds to allow the transport refrigeration unit to provide sufficient capacity to maintain a desired temperature within the transport unit while allowing the generator set to operate at a lower speed when the desired temperature within the transport unit can be maintained to conserve fuel.

In some embodiments, the generator set can detect that the transport refrigeration unit does not have sufficient capacity to maintain a desired temperature within a transport unit without direct communication with the transport refrigeration unit.

For example, in some embodiments, the generator set can detect that the transport refrigeration unit does not have sufficient capacity to maintain a desired temperature within a transport unit when (1) the RPM of a prime mover of the generator set is within a first threshold range, (2) a field current is above a second threshold, and (3) a controller of the generator set determines that the field current is increasing over time (i.e., a positive field current slope).

Other aspects of the embodiments described herein will become apparent by consideration of the detailed description and accompanying drawings.

BRIEF DESCRIPTION OF THE DRAWINGS

Referring now to the drawings in which like reference numbers represent corresponding parts throughout.

DETAILED DESCRIPTION

The embodiments disclosed herein relate to a generator set for a transport refrigeration system. More specifically, the embodiments described herein relate to a control system for a multi-speed generator set that can detect a capacity of a transport refrigeration system to maintain a desired temperature within a transport unit.

Figure 1:
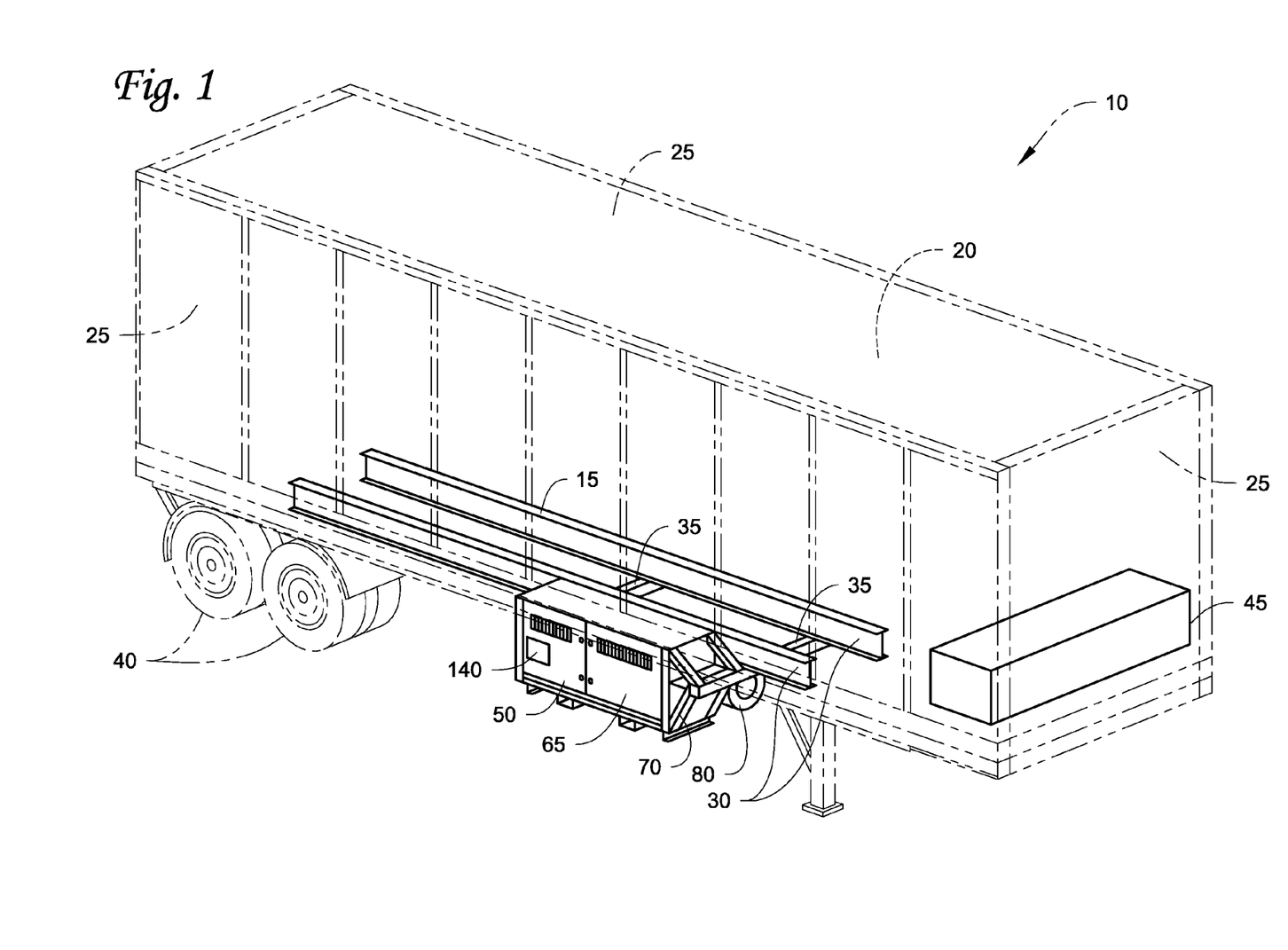
FIG. 1 is a perspective view of a transport refrigeration unit that includes a generator set, according to one embodiment.
Figure 2:
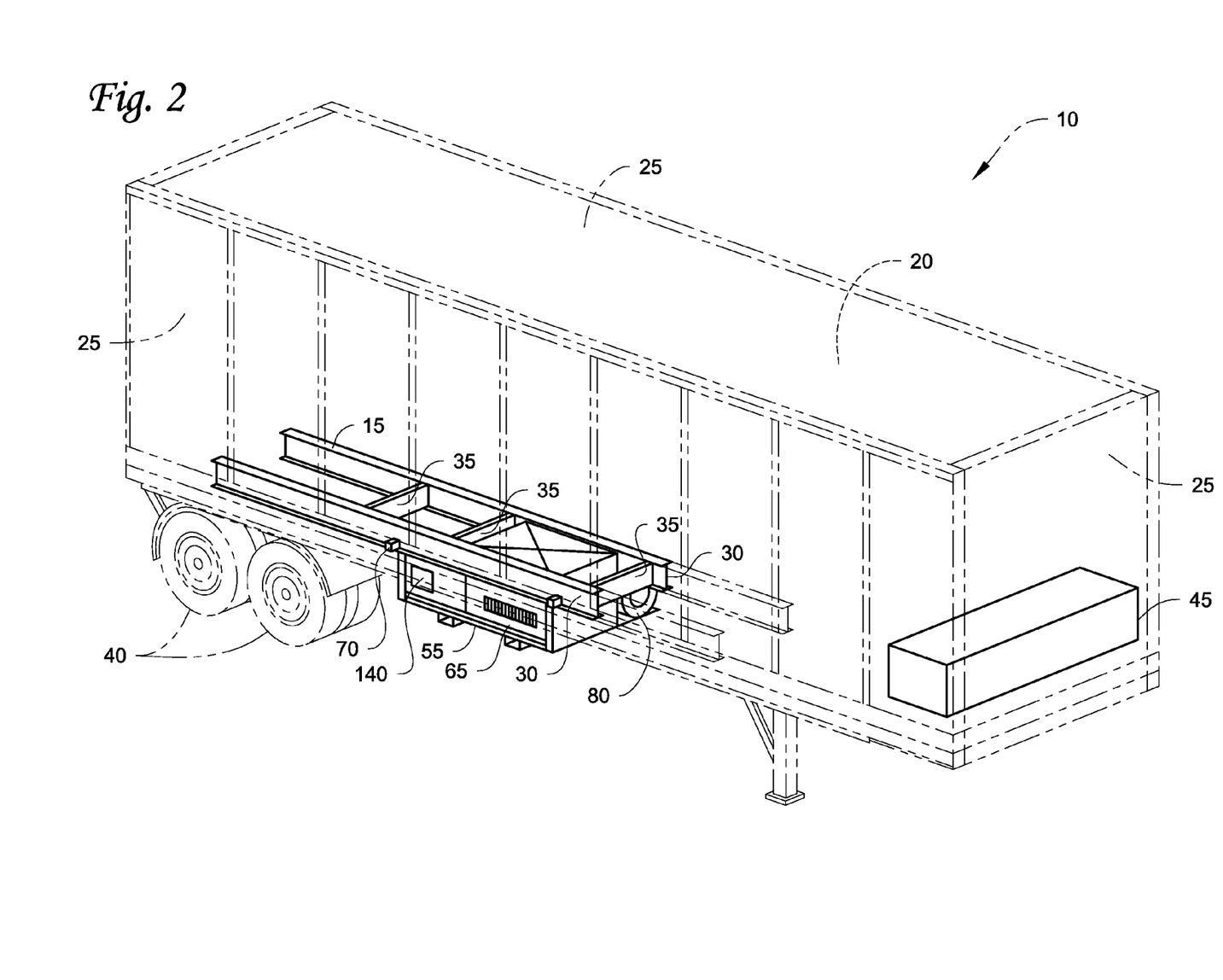
FIG. 2 is a perspective view of the transport refrigeration unit of FIG. 1 that includes a generator set according to another embodiment.
Figure 3:
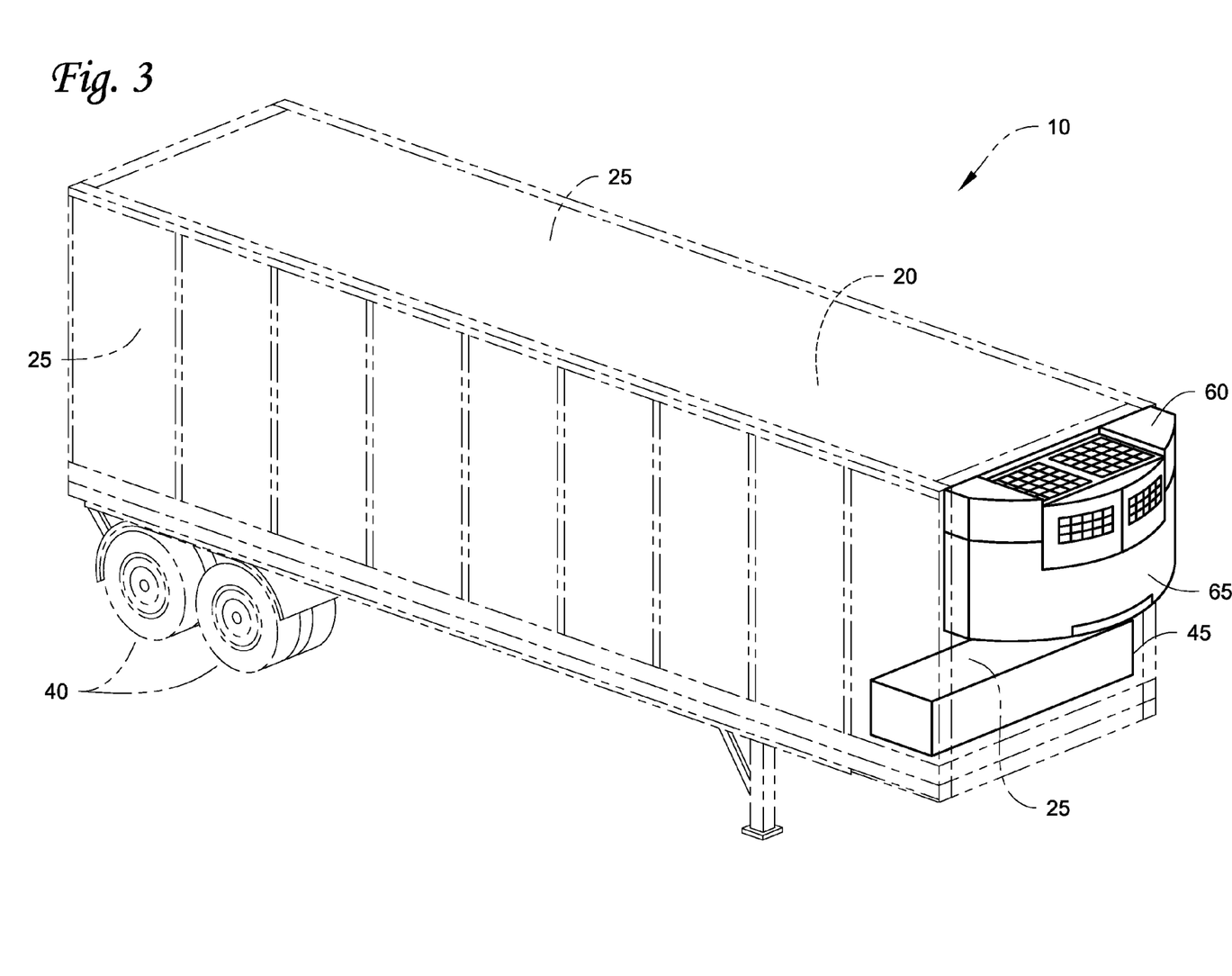
FIG. 3 is a perspective view of the transport refrigeration unit of FIG. 1 that includes a generator set according to yet another embodiment.

FIGS. 1-3 show a transport unit 10 for shipping perishable cargo. The transport unit 10 includes a frame 15 (see FIGS. 1-2) and a space 20 for storing perishable cargo that is substantially enclosed by walls 25. The frame 15 includes frame members 30 that extend along a substantial length of a bottom side of the transport unit 10. Cross members 35 are positioned between the frame members 30 to strengthen the frame 15.

Some cross members 35 extend outward from a side of the frame 15. The transport unit 10 illustrated in FIGS. 1-3 further include wheels 40 that are coupled to the frame members 30 so that the transport unit 10 may be moved using a truck or other vehicle (not shown). In other embodiments, the transport unit 10 may be a shipping container that is provided without wheels 40.

A transport refrigeration unit 60 (see FIG. 3) and a generator set 50 are attached to the transport unit 10. The transport refrigeration unit 60 is attached to one of the walls 25 adjacent a front of the transport unit 10 and is in communication with the space 20. However, the transport refrigeration unit 60 can be located anywhere on the transport unit 10. The transport refrigeration unit 60 is operable at a first frequency and a second frequency (e.g., 60 Hertz and 50 Hertz, respectively), includes a housing 65 that houses, for example, a refrigerant circuit (not shown), a transport refrigeration system controller, etc. The refrigerant circuit regulates various conditions (e.g., temperature, humidity, etc.) of the space 20, and can include a compressor coupled to a condenser and an evaporator that cools the space 20 and the perishable cargo. The refrigerant circuit employed in the transport refrigeration unit 60 is well known, and need not be discussed in detail.

FIG. 1 shows the generator set 50 attached to the frame 15 along a side of the transport unit 10 and substantially to one side of one of the frame members 30. FIG. 2 shows another generator set 55 attached to the frame 15 substantially between the frame members 30 and aligned with a center of the bottom of the transport unit 10. FIGS. 1-3 show yet another generator set 45 that is positioned adjacent a front side of the transport unit 10. The generator set 55 shown in FIG. 2 include elements that are similar to the elements of the generator set 50 illustrated in FIG. 1 and the generator set 45 shown in FIGS. 1-3. As such, the embodiments disclosed herein will be discussed with regard to the generator set 50. However, it is to be understood that each generator set 45, 50, 55 is within the scope of the embodiments described herein and should not be limited to the generator set 50 discussed herein.

FIG. 1 shows the generator set 50 attached to the frame 15 by a mounting assembly 70. The mounting assembly 70 extends between the housing and the cross members 35, and is made of a high-strength material (e.g., steel, etc.) to rigidly attach the generator set 50 to the transport unit 10.

Figure 4:
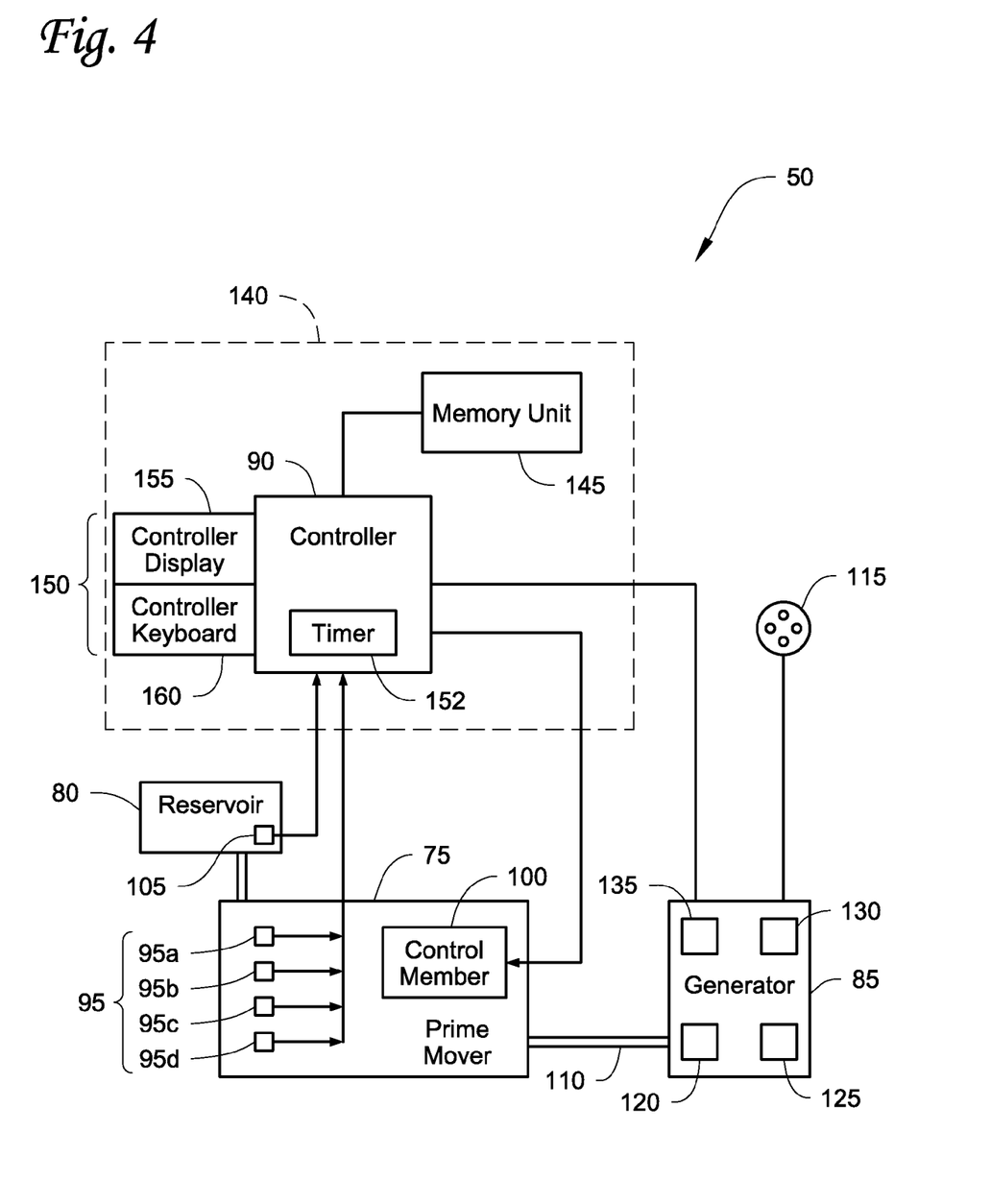
FIG. 4 is a schematic view of the generator set of FIG. 1.

FIG. 4 shows that the generator set 50 further includes a prime mover 75, a fuel reservoir 80, a generator 85, and a controller 90, each disposed in the housing 65. The illustrated prime mover 75 is an internal combustion engine (e.g., diesel engine, etc.) that has a cooling system (e.g., water or liquid coolant system), an oil lubrication system, and an electrical system (none shown). An air filtration system (not shown) filters air directed into a combustion chamber (not shown) of the prime mover 75. The prime mover 75 includes component sensors 95 that deliver signals indicative of various component conditions to the controller 90. For example, when the prime mover 75 is a diesel engine, the component sensors 95 can include a water temperature sensor 95a, an engine rpm sensor 95b, an oil pressure sensor 95c, and an airflow sensor 95d. In some embodiments, the prime mover 75 may include additional sensors (not shown) to sense other component conditions of the prime mover 75 (e.g., fuel injection, etc.).

The prime mover 75 further includes a governor mechanism (not shown) and an electromechanical device or control member 100 coupled to the governor mechanism to control a speed of the prime mover 75. The governor mechanism may be a governor or fuel solenoid that regulates fuel flow into the prime mover 75. The prime mover 75 is operable at least at a first speed and a second speed, and the control member 100 is configured to vary the prime mover 75 between the first speed and the second speed using the governor mechanism. In the illustrated embodiment, the first speed can be about 1500 revolutions per minute (RPMs), and the second speed can be about 1800 RPMs. In other embodiments, the first and second speeds may be different from 1500 RPMs and 1800 RPMs, respectively. In yet some other embodiments, the prime mover 75 can be a variable speed prime mover that can be configured to run at any speed between a minimum speed (e.g., 0 RPMs) to a maximum speed (e.g., 1800 RPMs). Also, in some embodiments, the prime mover 75 can be an electronically controlled engine that electronically controls a speed of the prime mover 75.

The fuel reservoir 80 is in fluid communication with the prime mover 75 to deliver a supply of fuel to the prime mover 75. As shown in FIG. 1, the fuel reservoir 80 is coupled to the housing 65 below the frame 15. As shown in FIG. 4, the fuel reservoir 80 includes a fuel sensor 105 that is in electrical communication with the controller 90 to deliver a signal indicative of a fuel level in the fuel reservoir 80.

The generator 85 is coupled to the prime mover 75 by a drive shaft 110 that transfers mechanical energy from the prime mover 75 to the generator 85. The generator 85 includes a power receptacle 115 that is in electrical communication with the transport refrigeration unit 45 via a power cable (not shown) to provide electrical power to the transport refrigeration unit 45.

The generator 85 is an alternating current ("AC"), 3-phase generator that generally includes a rotor 120, a stator 125, and a voltage regulator or DC generator 130. The rotor 120 is coupled to the drive shaft 110 such that the prime mover 75 is operable to rotatably drive the rotor 120 at least at the first non-zero speed and the second non-zero speed. The stator 125 is a stationary component of the generator 85 that includes magnetic pole pairs (e.g., two pole pairs).

The voltage regulator 130 includes a field voltage and a field current that are generated by a regulation element (not shown) that is coupled to the voltage regulator 130. In some embodiments, the regulation element includes batteries or other solid-state components that generate a direct current through the voltage regulator 130. Those skilled in the art will understand that the field voltage and the field current define a field excitation. The field excitation of the generator 85 is generally considered a field of the generator 85. The field can be one of the rotor 120 and the stator 125, depending on the component to which the field excitation is applied.

Rotation of the rotor 120 through the magnetic field induces an output current from the generator 85. The induced output 120 current produces an output voltage of the generator 85 that is directed through the power receptacle 115 to the transport refrigeration unit 45. The component of the generator 85 where the output voltage is drawn is generally considered an armature of the generator 85, and is one of the rotor 120 and the stator 125 (i.e., the component of the generator 85 that does not receive the field excitation). Generally, the armature converts rotational mechanical energy from the drive shaft 110 to electrical energy from the generator 85. One of ordinary skill in the art would recognize that the rotor 120 and the stator 125 are interchangeable as the armature and the field of the generator 85, and that other generators could be used in place of the generator 85. The generator 85 as described herein is exemplary only.

The generator 85 further includes an output frequency that can be determined by the speed of the prime mover or the field voltage of the generator. In some embodiments, the generator 85 is operable at a first output frequency when the prime mover 75 is operated at the first speed, and is operable at a second output frequency when the prime mover 75 is operated at the second speed. The first output frequency of the generator 85 is the same as the first frequency of the transport refrigeration unit 45 (e.g., 60 Hertz). The second output frequency of the generator 85 is the same as the second frequency of the transport refrigeration unit 45 (e.g., 50 Hertz).

The output voltage of the generator 85 is determined by the output frequency. As such, the generator 85 is operable at a first output voltage in response to operation of the generator 85 at the first frequency. The generator 85 is further operable at a second output voltage in response to operation of the generator 85 at the second frequency. For example, when the generator 85 is operated at the first frequency (e.g., 60 Hertz), the first output voltage is ~460 volts. When the generator 85 is operated at the second frequency (e.g., 50 Hertz), the second output voltage is ~380 volts. Thus, the speed of the prime mover 75 determines the frequency and output voltage of the generator 85.

The generator 85 is defined by a constant load capacity that is sufficient to provide adequate power to the transport refrigeration unit 45 under various loads. A load on the generator 85 corresponds to the cooling demand or load on the transport refrigeration unit 45 (e.g., electrical power needed by the transport refrigeration unit), and is variable in response to changes in the load on the transport refrigeration unit 45. The generator 85 is operable at a load ratio that is dependent on the generator load for a given generator load capacity, and may vary from zero percent of the generator load capacity (i.e., when no generator load exists) to 100 percent of the generator load capacity (i.e., when the transport refrigeration unit 45 is operating at full capacity, indicating a full load on the generator 85).

A load sensor 135 is in electrical communication with the generator 85 to sense the generator load, and is further in electrical communication to deliver a signal indicative of the generator load to the controller 90. In one embodiment, the load sensor 135 is configured to sense the generator load based on the field current of the generator 85. In another embodiment, the load sensor 135 is configured to sense the generator load based on the field voltage of the generator 85. In yet another embodiment, the load sensor 135 is configured to sense the generator load based on the output current of the generator 85.

The controller 90 is coupled to the housing 65 within a control panel 140 (FIG. 1). In other embodiments, the controller 90 may be located remotely from the housing 65. The controller 90 is a microprocessor that makes various operating decisions in response to various signals from the remaining components of the generator set 50. The controller 90 is in electrical communication with the generator 85, the component sensors 95, the control member 100, and the fuel sensor 105.

FIG. 4 shows the control panel 140 that further includes a memory unit 145, an operator interface 150, and a timer 152. The memory unit 145, the operator interface 150, and the timer 152 are in electrical communication with the controller 90. In some embodiments, the memory unit 145 may be a Random Access Memory ("RAM") that can maintain a data log related to parameters of the prime mover 75 and the generator 85, as well as other data.

The operator interface 150 includes a display 155 and a keyboard 160 for viewing and entering commands into the controller 90. The timer 152 separately measures a duration time that the prime mover 75 operates at the first speed, and a duration time that the prime mover 75 operates at the second speed.

In operation, the controller 90 receives the signal indicative of the fuel level from the fuel sensor 105 to monitor the quantity of fuel available to the prime mover 75. In response to a signal from the fuel sensor 105 indicative of a low fuel condition, the controller 90 generates a warning or alarm.

The controller 90 also receives signals from the component sensors 95 that are indicative of various operating parameters of the prime mover (e.g., prime mover speed, coolant temperature, etc.). The controller 90 compares these signals with various predetermined parameters stored in the memory unit 145 that are associated with the respective signals from the component sensors 95. When the parameters monitored by the component sensors 95 are within predetermined parameters, the prime mover 75 is in a normal operating state. When one or more of the monitored parameters are outside the predetermined parameters stored in the memory unit 145, the controller 90 may generate an alarm or warning signal indicative of an out-of-state condition for the prime mover 75.

The prime mover 75 is variable between the first speed and the second speed to control the frequency and the output voltage of the generator 85. When the prime mover 75 operates at the first speed, the generator 85 operates at the first frequency and the first output voltage. When the prime mover 75 operates at the second speed, the generator 85 operates at the second frequency and the second output voltage. The prime mover 75 is variable between the first speed and the second speed using the controller 90 such that the frequency and output voltage of the generator 85 can be changed. Under normal operating conditions, the prime mover 75 operates at one of the first speed and the second speed such that the frequency and the output voltage of the generator 85 remain substantially constant relative to the prime mover speed.

During normal operation, the load sensor 135 can sense the load of the generator 85 and send a signal indicative of the generator load to the controller 90. The controller 90 receives the signal indicative of the sensed load and determines a load ratio based on the sensed load and the load capacity of the generator 80 stored in the memory unit 145. The controller 90 compares the calculated load ratio to a predetermined load ratio stored in the memory unit 145. The controller 90 selectively varies the speed of the prime mover 75 to change the frequency and the output voltage of the generator 85 based on the comparison of the calculated and predetermined load ratios.

Figure 5:
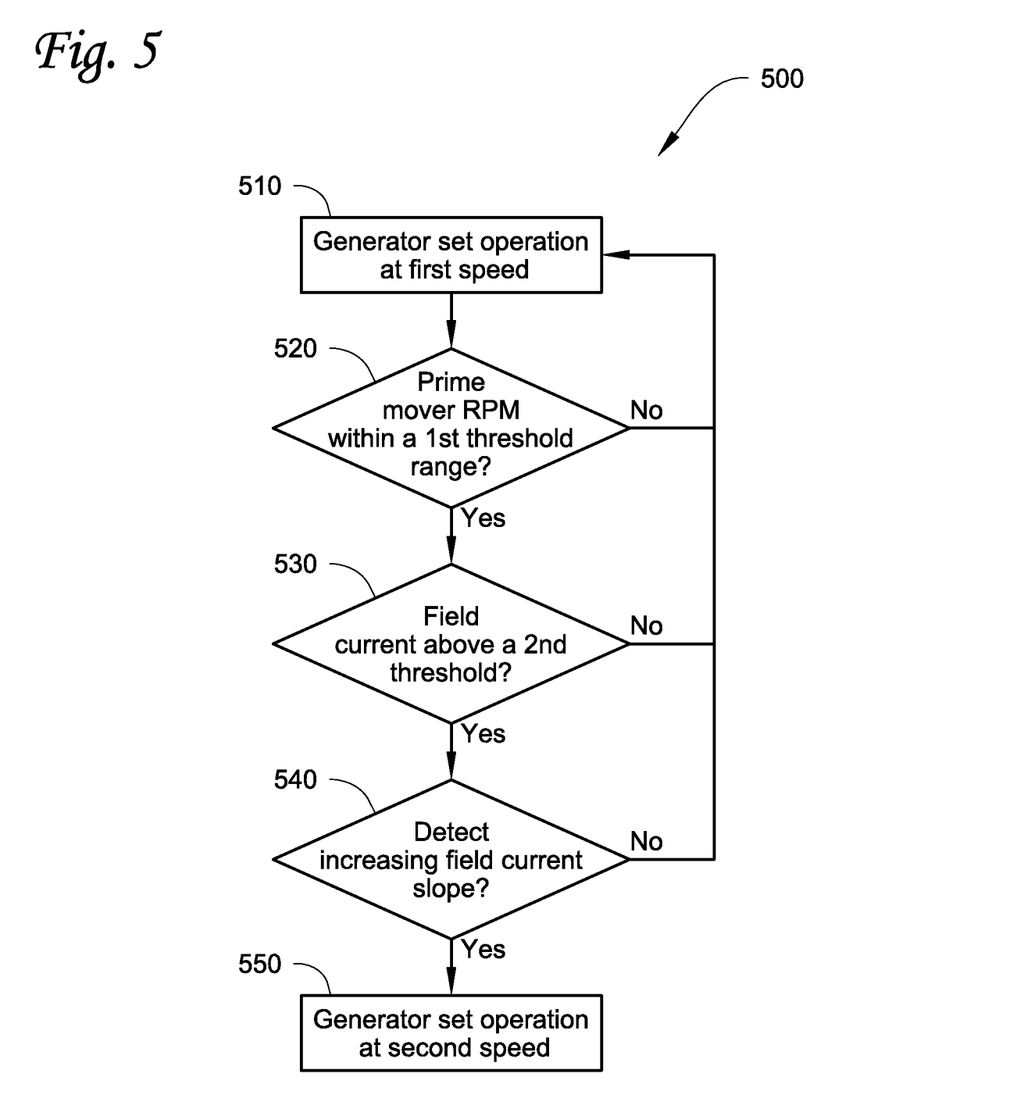
FIG. 5 is a flow chart of a process for detecting a capacity of a transport refrigeration unit to maintain a desired temperature using the generator set of FIG. 1.

FIG. 5 illustrates a flowchart of a process 500 for detecting a capacity of a transport refrigeration unit 45 to maintain a desired temperature using the generator set 45 of FIG. 1.

The process 500 begins at 510, where the generator set 50 is operating the prime mover 75 at the first speed (e.g., about 1500 RPMs). The process 500 then proceeds to 520.

At 520, the controller 90 receives signals from the component sensors 95 indicative of the prime mover speed and determines whether the RPM of the prime mover 75 is within a first threshold range. In some embodiments, the first threshold range can be between 1500 and 1560 RPM. If the controller 90 determines that the RPM of the prime mover 75 is within the first threshold range, the process 500 proceeds to 530. If the controller 90 determines that the RPM of the prime mover 75 is not within the first threshold range, the process 500 proceeds back to 510.

At 530, the controller 90 determines a field current of the generator 85 and determines whether the field current is above a second threshold. In some embodiments, the second threshold can be about 1.5 amps. In some embodiments, the controller 90 determines the field current of the generator 85 based on information sent from the load sensor 135. If the controller 90 determines that the field current of the generator 85 is above the second threshold, the process 500 proceeds to 540. If the controller 90 determines that the field current of the generator 85 is not above the second threshold, the process 500 proceeds back to 510.

At 540, the controller 90 detects the field current of the generator 85 over a period of time to determine whether the field current is increasing over time (i.e., a positive field current slope). In some embodiments, the controller 90 periodically determines the field current of the generator 85 based on information sent from the load sensor 135 and stores this information in memory unit 145 over a period of time. The controller 90 can then determine whether there is a positive field current slope by accessing field current information over time from the memory unit 145. If the controller 90 determines that there is a positive field current slope, the process 500 proceeds to 550. If the controller 90 determines that determines that there is not a positive field current slope, the process 500 proceeds back to 510.

At 550, the controller 90 detects that that the transport refrigeration unit 45 does not have sufficient capacity to maintain a desired temperature within a transport unit 10. Accordingly, the controller 90 controls the prime mover 75 to operate at a second speed (e.g., about 1500 RPMs) that is higher than the first speed to provide more power to the transport refrigeration unit 45 and normal operation of the generator set 45 ensues.

While the process 500 shows that 520, 530 and 540 are performed sequentially, it is understood that in other embodiments, 520, 530 and 540 can be performed in parallel or in a different sequential order.

Aspects:

It is noted that any of aspects 1-6, 7-13 and 14-20 can be combined.

1. A method for controlling a speed of a generator set that includes a prime mover and a generator, the method comprising:
    a controller determining whether a transport refrigeration unit has sufficient capacity to maintain a desired temperature within a transport unit;
    changing a speed of the prime mover from a first speed to a second speed, that is greater than the first speed, so as to provide sufficient capacity to the transport refrigeration unit when the transport refrigeration unit does not have sufficient capacity to maintain a desired temperature within the transport unit.
2. The method of aspect 1, wherein the controller determining whether the transport refrigeration unit has sufficient capacity to maintain the desired temperature within the transport unit includes:
    the controller determining whether the speed of the prime mover is within a first threshold range;
    the controller determining whether a load of the generator is above a second threshold; and
    the controller detecting an increasing generator load slope condition.
3. The method of aspect 2, wherein changing the speed of the prime mover from the first speed to the second speed includes switching the prime mover from the first speed to the second speed when the first speed of the prime mover is within the first threshold range, the load of the generator is above the second threshold and the increasing generator load slope condition is detected.
4. The method of any of aspects 2-3, wherein the load of the generator includes a field current of the generator and the increasing generator load slope condition is an increasing field current over a period of time.
5. The method of any of aspects 2-4, wherein the controller detecting the increasing generator load slope condition includes:
    storing the load of the generator over a time period;
    determining whether the load of the generator is increasing over the time period; and
    detecting the increasing generator load slope condition when the load of the generator is increasing over the time period.
6. The method of any of aspects 1-5, wherein the first speed is 1500 revolutions per minute (RPMs) and the second speed is 1800 RPMs.
7. A generator set comprising:
    a prime mover configured to generate mechanical energy;
    a generator coupled to the prime mover, the generator configured to convert the mechanical energy generated by the prime mover into electrical energy; and
    a controller configured to determine configured to:
        determine whether a transport refrigeration unit has sufficient capacity to maintain a desired temperature within a transport unit, and
        change a speed of the prime mover from a first speed to a second speed, that is greater than the first speed, when the transport refrigeration unit does not have sufficient capacity to maintain the desired temperature within the transport unit.
8. The generator set of aspect 7, wherein the controller is configured to:
    determine whether the speed of the prime mover is within a first threshold range;
    determine whether a load of the generator is above a second threshold; and
    detect an increasing generator load slope condition.
9. The generator set of aspect 8, wherein the controller is configured to change the speed of the prime mover when the first speed of the prime mover is within the first threshold range, the load of the generator is above the second threshold and the increasing generator load slope condition is detected.
10. The generator set of any of aspects 8-9, wherein the load of the generator includes a field current of the generator and the increasing generator load slope condition is an increasing field current over a period of time.
11. The generator set of any of aspects 8-10, wherein the controller is configured to:
    store the load of the generator over a time period;
    determine whether the load of the generator is increasing over the time period; and
    detect the increasing generator load slope condition when the load of the generator is increasing over the time period.
12. The generator set of any of aspects 7-11, wherein the first speed is 1500 revolutions per minute (RPMs) and the second speed is 1800 RPMs.
13. The generator set of any of aspects 7-12, further comprising a load sensor configured to monitor a generator load of the generator and send a signal indicative of the generator load to the controller.
14. A transport refrigeration system:
    a transport refrigeration unit;
    a generator set configured to power the transport refrigeration unit, the generator set including:
        a prime mover configured to generate mechanical energy,
        a generator coupled to the prime mover, the generator configured to convert the mechanical energy generated by the prime mover into electrical energy, and
        a controller configured to determine configured to:
            determine whether a transport refrigeration unit has sufficient capacity to maintain a desired temperature within a transport unit, and
            change a speed of the generator set from a first speed to a second speed, that is greater than the first speed, when the transport refrigeration unit does not have sufficient capacity to maintain the desired temperature within the transport unit.
15. The transport refrigeration system of aspect 14, wherein the controller is configured to:
    determine whether the speed of the prime mover is within a first threshold range;
    determine whether a load of the generator is above a second threshold; and
    detect an increasing generator load slope condition.

16. The transport refrigeration system of aspect 15, wherein the controller is configured to change the speed of the prime mover when the first speed of the prime mover is within the first threshold range, the load of the generator is above the second threshold and the increasing generator load slope condition is detected.

17. The transport refrigeration system of any of aspects 15-16, wherein the load of the generator includes a field current of the generator and the increasing generator load slope condition is an increasing field current over a period of time.

18. The transport refrigeration system of any of aspects 15-17, wherein the controller is configured to:
store the load of the generator over a time period;
determine whether the load of the generator is increasing over the time period; and
detect the increasing generator load slope condition when the load of the generator is increasing over the time period.

19. The transport refrigeration system of any of aspects 14-18, wherein the first speed is 1500 revolutions per minute (RPMs) and the second speed is 1800 RPMs.

20. The transport refrigeration system of any of aspects 14-19, further comprising a load sensor configured to monitor a generator load of the generator and send a signal indicative of the generator load to the controller.

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

The invention claimed is:

1. A method for controlling a speed of a generator set that includes a prime mover and a generator, the method comprising:
a controller determining whether a transport refrigeration unit has sufficient capacity to maintain a desired temperature within a transport unit;
changing a speed of the prime mover from a first speed to a second speed, that is greater than the first speed, so as to provide sufficient capacity to the transport refrigeration unit when the transport refrigeration unit does not have sufficient capacity to maintain a desired temperature within the transport unit,
wherein the controller determining whether the transport refrigeration unit has sufficient capacity to maintain the desired temperature within the transport unit includes:
the controller determining whether the speed of the prime mover is within a first threshold range;
the controller determining whether a load of the generator is above a second threshold; and
the controller detecting a positive generator load slope condition.

2. The method of claim 1, wherein changing the speed of the prime mover from the first speed to the second speed includes switching the prime mover from the first speed to the second speed when the first speed of the prime mover is within the first threshold range, the load of the generator is above the second threshold and the positive generator load slope condition is detected.

3. The method of claim 1, wherein the load of the generator includes a field current of the generator and the positive generator load slope condition is an increasing field current over a period of time.

4. The method of claim 1, wherein the controller detecting the positive generator load slope condition includes:
storing the load of the generator over a time period;
determining whether the load of the generator is increasing over the time period; and
detecting the positive generator load slope condition when the load of the generator is increasing over the time period.

5. The method of claim 1, wherein the first speed is 1500 revolutions per minute (RPMs) and the second speed is 1800 RPMs.

6. A generator set comprising:
a prime mover configured to generate mechanical energy;
a generator coupled to the prime mover, the generator configured to convert the mechanical energy generated by the prime mover into electrical energy; and
a controller configured to:
determine whether a transport refrigeration unit has sufficient capacity to maintain a desired temperature within a transport unit, and
change a speed of the prime mover from a first speed to a second speed, that is greater than the first speed, when the transport refrigeration unit does not have sufficient capacity to maintain the desired temperature within the transport unit,
wherein the controller is further configured to:
determine whether the speed of the prime mover is within a first threshold range;
determine whether a load of the generator is above a second threshold; and
detect a positive generator load slope condition.

7. The generator set of claim 6, wherein the controller is configured to change the speed of the prime mover when the first speed of the prime mover is within the first threshold range, the load of the generator is above the second threshold and the positive generator load slope condition is detected.

8. The generator set of claim 6, wherein the load of the generator includes a field current of the generator and the positive generator load slope condition is an increasing field current over a period of time.

9. The generator set of claim 6, wherein the controller is configured to:
store the load of the generator over a time period;
determine whether the load of the generator is increasing over the time period; and
detect the positive generator load slope condition when the load of the generator is increasing over the time period.

10. The generator set of claim 6, wherein the first speed is 1500 revolutions per minute (RPMs) and the second speed is 1800 RPMs.

11. The generator set of claim 6, further comprising a load sensor configured to monitor a generator load of the generator and send a signal indicative of the generator load to the controller.

12. A transport refrigeration system:
a transport refrigeration unit;
a generator set configured to power the transport refrigeration unit, the generator set including:
a prime mover configured to generate mechanical energy,
a generator coupled to the prime mover, the generator configured to convert the mechanical energy generated by the prime mover into electrical energy, and
a controller configured to determine configured to:

determine whether a transport refrigeration unit has sufficient capacity to maintain a desired temperature within a transport unit, and change a speed of the generator set from a first speed to a second speed, that is greater than the first speed, when the transport refrigeration unit does not have sufficient capacity to maintain the desired temperature within the transport unit, wherein the controller is further configured to:
   determine whether the speed of the prime mover is within a first threshold range;
   determine whether a load of the generator is above a second threshold; and
   detect a positive generator load slope condition.

13. The transport refrigeration system of claim 12, wherein the controller is configured to change the speed of the prime mover when the first speed of the prime mover is within the first threshold range, the load of the generator is above the second threshold and the positive generator load slope condition is detected.

14. The transport refrigeration system of claim 12, wherein the load of the generator includes a field current of the generator and the positive generator load slope condition is an increasing field current over a period of time.

15. The transport refrigeration system of claim 12, wherein the controller is configured to:
   store the load of the generator over a time period;
   determine whether the load of the generator is increasing over the time period; and
   detect the positive generator load slope condition when the load of the generator is increasing over the time period.

16. The transport refrigeration system of claim 12, wherein the first speed is 1500 revolutions per minute (RPMs) and the second speed is 1800 RPMs.

17. The transport refrigeration system of claim 12, further comprising a load sensor configured to monitor a generator load of the generator and send a signal indicative of the generator load to the controller.

* * * * *